May 30, 1933.  W. P. KELLETT  1,911,958
POWER PLANT SYSTEM FOR TRANSPORT VEHICLES
Filed March 17, 1930  2 Sheets-Sheet 1
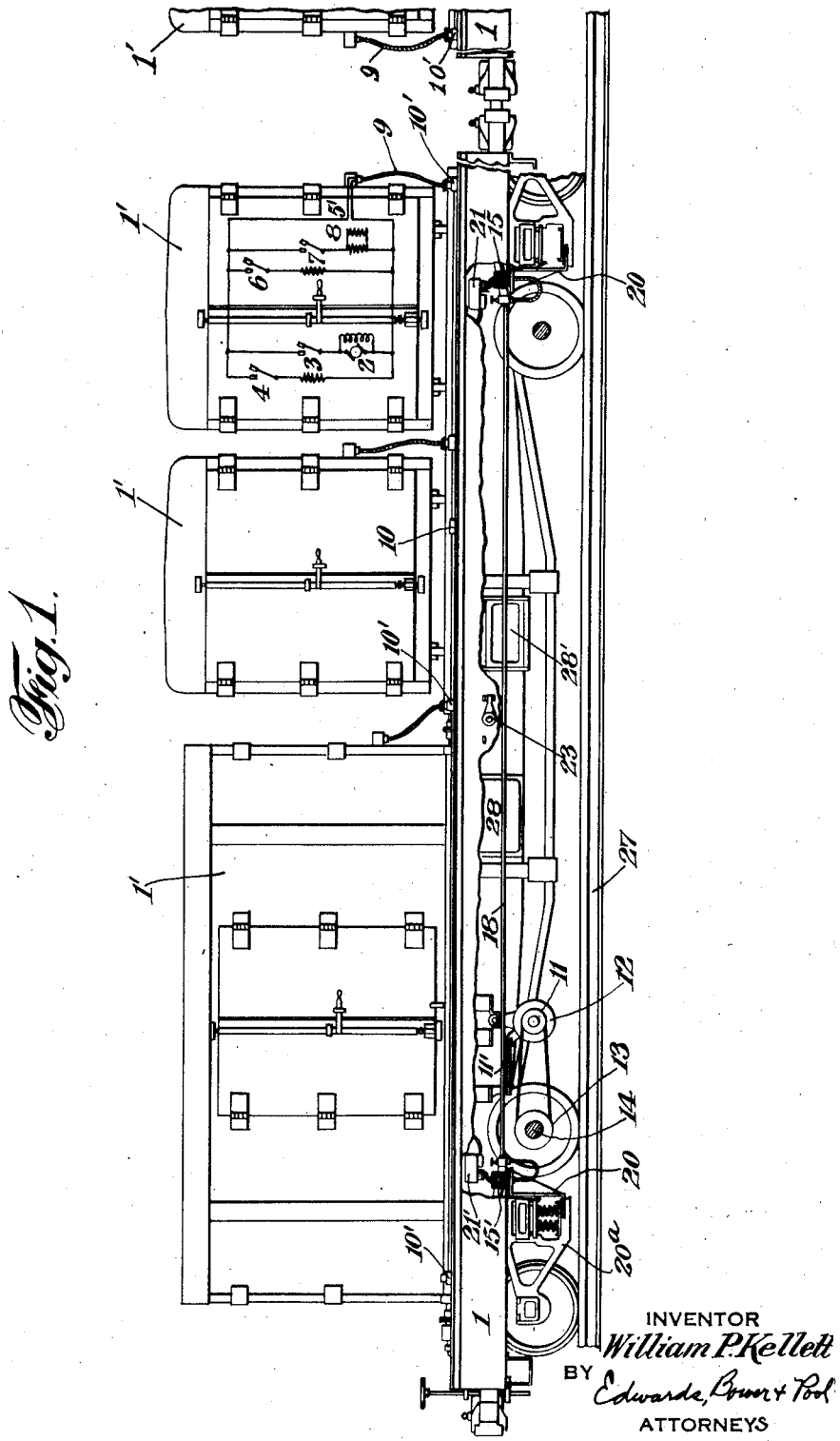

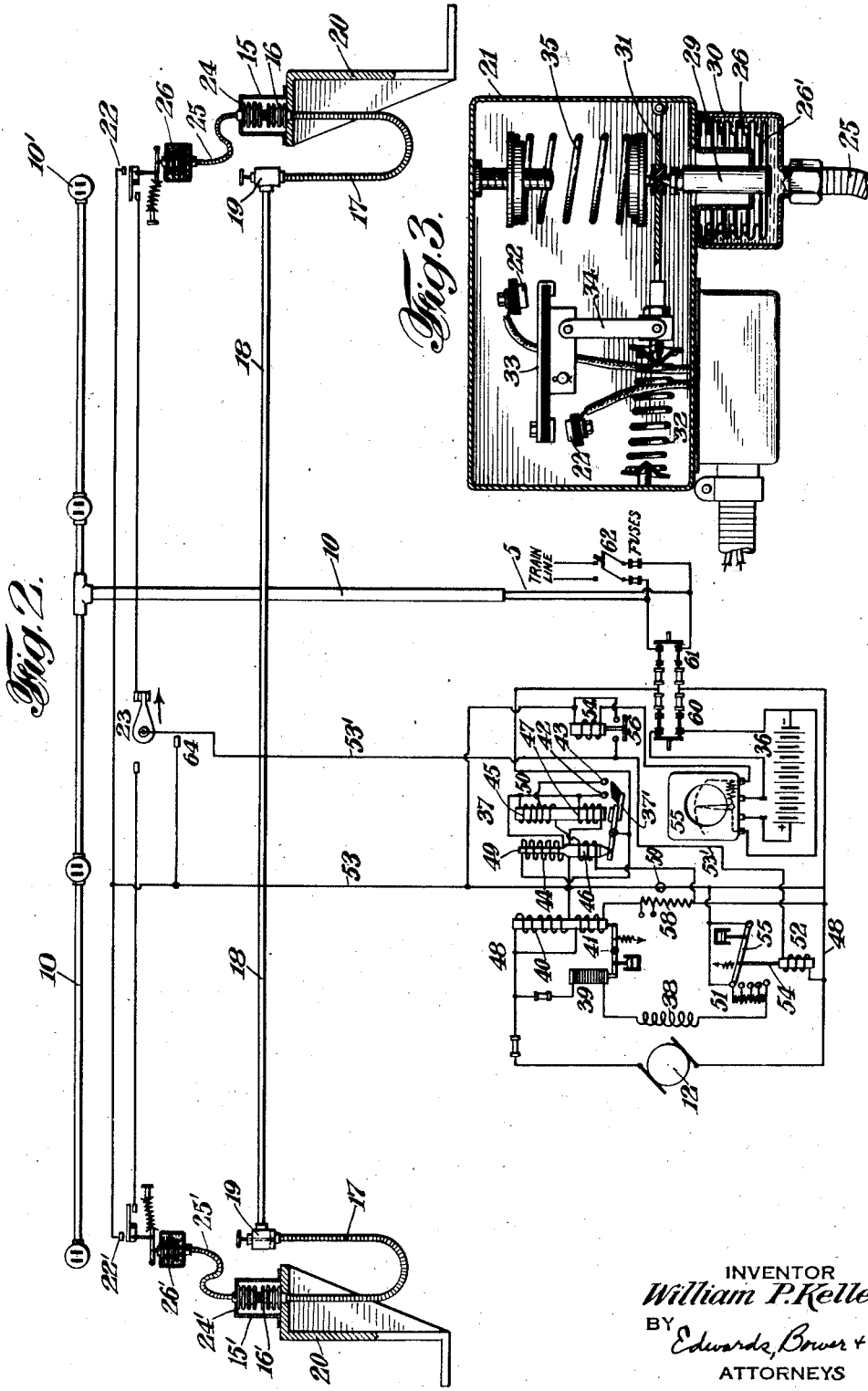

Patented May 30, 1933

1,911,958

UNITED STATES PATENT OFFICE

WILLIAM PLATTS KELLETT, OF NEW YORK, N. Y.

POWER PLANT SYSTEM FOR TRANSPORT VEHICLES

Application filed March 17, 1930. Serial No. 436,632.

This invention has for its general object the provision of a method and means whereby the available kinetic energy of a vehicle or train of vehicles moving down grade may be stored and utilized for the operation of auxiliary apparatus installed on the said vehicle or vehicles; and more especially to conserve and utilize the excess or surplus power of the prime mover of the vehicle or vehicles under such conditions.

By the employment of the invention, there is provided a reserve supply of power for the operation of the auxiliary devices aforesaid and which may be brought into use during periods when the full tractive effort of the prime mover is required for the transport of the vehicle or train of vehicles, thereby enabling the prime mover to handle its full rated tonnage at suitable speeds regardless of the power required for the operation of the auxiliary devices or equipment.

In carrying out the invention the principle is employed of controlling the conservation and storing of the energy by the levels of a fluid medium at different points in a system, as determined by the grade of the road on which the vehicle or train is traveling.

While my invention is applicable to many different types of vehicles, and the power stored up may be used for a variety of purposes, it is particularly adapted for use in temperature and similar control systems, and by way of illustration my invention will be described as applied to a system of this type.

In this system, the transportation by train of perishable products over long distances and through areas of varying temperatures requires an efficient and dependable means of maintaining the proper temperature within the cars or containers of the train within predetermined limits. Mechanical refrigeration of insulated cars in place of the present method of cooling by natural ice has long been considered as a desirable development but, as practically all of the devices so far developed have been dependent for their operation on power taken from the car axle, with no means of removing this extra load at times when the full tractive effort of the locomotive is required for train operation, little or no satisfactory progress has been made.

In my system use is made of electrical generators each driven from a car axle, with control means which will connect the generator to the work circuit when the train of cars is traveling down a grade. At such times the generator will supply power to the work circuit and also charge a storage battery. My system, however, prevents the connection of the generator to the load under all other grade conditions with the exception that when the battery is discharged to a predetermined point, the generator will be connected regardless of grade conditions, but only then in the event that the car speed is sufficient to generate a voltage high enough to charge the battery and supply a proper voltage to the work circuit.

In carrying out my invention I utilize the change in head or hydrostatic pressure at the ends of a liquid pressure system, as established by down grade conditions over which the car is traveling, to overcome balanced pressure maintained on the ends of the system and operate switching means which connect the generator to the storage unit and work circuit. To prevent accidental operation of the control switch under service conditions it is desirable that a considerable resistance should be overcome before the switch will close, and a relatively long column of liquid is therefore provided to give the necessary increase in pressure to close the switch on a small down grade, I prefer to make this column approximately as long as the car which is equipped with my system. The invention will be specifically described in connection with the accompanying drawings wherein;

Fig. 1 shows refrigerator cars equipped with my invention;

Fig. 2 shows diagrammatically the generator and storage battery control circuit, together with details of the control apparatus; and Fig. 3 is a detailed view of an approved type of one of the grade selector switch units shown in Fig. 1.

Referring to Fig. 1 of the drawings there are shown railway cars 1 having a number of separate shipping compartments or containers 1', each of which may have electrically operated units for maintaining a predetermined range of temperatures. To insure that a certain low temperature range will be maintained a refrigeration system comprising motor 2, starter 3, and thermostat control 4, may be provided. This thermostat may be set, for example, to cut in at 40° and cut out at 35° and by controlling the circuit of the refrigerator motor starter thereby controls the refrigeration of the container. The motor and starter are connected across the branch circuit 5'. The mechanical details of the refrigeration system are not shown since they do not comprise any part of my invention. It will be understood that the cars shown form part of a train suitably connected together and with a locomotive to furnish the motive power; and further that these are examples of motor driven vehicles to which the invention is applicable.

Should the outside temperature be so low as to reduce the temperature within the container to a point lower than that desired, a second thermostat 6 may be used to energize switch 7 and thereby cut in a heater 8 to raise the temperature to the predetermined point. The branch circuit 5' may be connected to the main current supply line 5 by flexible cable 9. The latter is connected to the container and supply line so that it may be disconnected to permit the container to be removed from the car, or to open up the circuit for other reasons. Each of the containers or compartments have similar temperature control units, and as many outlets 10' as are necessary or desired may be provided in the conduit 10 in which the supply line is enclosed. These outlets may also be used to supply current to an adjacent car in the event of failure of its power plant, and, similarly, current may be obtained from an adjacent car to supply the temperature control apparatus shown. Switches 60, 61 and 62 (Fig. 2) permit the disconnection of the power plant of the car from its supply line in such an emergency, and also permit the connection of the supply line to a train line where the same is available for emergency use.

Underneath the car and mounted to its body is shown a direct current generator 12 of the under-frame type which is belt driven from a pulley 13 mounted on car wheel axle 14. The generator is preferably mounted so that the centers of its pulley 11 and the axle pulley 13 are on the center line of the car to decrease the radius through which the axle pulley will travel when the car is on a curve. Either a compression or tension spring 11' may be used to maintain uniform belt tension. It may also be desirable to connect the generator to the car axle by gearing or other positive driving means. Means must also be provided for shifting the generator brushes through an angle of 180 electrical degrees dependent upon the direction in which the car is traveling.

The details of this type of generator and its mounting are well known in the art, however, and are therefore omitted here. Under certain conditions hereinafter stated the generator is connected to the work circuit and a storage battery for supplying electric current to the supply line 5. The car control equipment and storage battery shown in Fig. 2 may be mounted in compartments 28, 28' underneath the car.

Attached to the trucks by rigid supporting brackets 20 at each end of the cars in Fig. 1 are grade selectors 15 and 15', each having a bellows 16, 16' which is connected by a flexible connection such as a reinforced hose 17 to a pipe 18. The latter is shown as fastened to the body of the car and is preferably in alignment with the center line of the car so that swaying or side movement of the car will not have a tendency to disturb the system; the grade selectors 15 and 15' being also located approximately in the center line at each end of the car. To obtain the best results it is desirable to support the pipe at or below the level of the grade selectors, as shown.

Flexible couplings 17, pipe 18 and valves 19 form a communicating system between the selectors, and the system is filled with a fluid of high density, such as mercury. The construction is such that the flexible connections will take up variations, due to side sway and up-and-down movement of the car body, between the mercury container or pipe 18 on the car body and the bellows on the trucks. The valves 19 are preferably of the needle type and prevent undue surging of the mercury in the pipe or tube 18.

The operation of the grade selector system is as follows:

Each of the selectors 15 and 15' is mounted on the car trucks so as to be maintained at a constant fixed distance from the track 27. The bellows 16 and 16' are of a type which will expand or contract according to the pressure or height of the mercury within.

Any movement of bellows 16 or 16' is communicated to the corresponding grade selector switch units 21, 21' to render operative or inoperative the switch contacts 22, 22' which, in turn, thru medium of direction selector switch 23, energizes or de-energizes the control apparatus (Fig. 2). Such movements of the bellows may be communicated by a system comprising bellows 24, flexible coupling 25 and bellows 26 to control the operativeness or inoperativeness of the switch contacts 22 and 22'. The bellows 24 and 26 may be connected by means of a piano wire or other means within coupling 25, but I prefer to use a fluid as the pressure transmitting medium. The preferred form of grade selector switch unit is hereinafter described in connection with Fig. 3.

As long as grade selectors 15 and 15' are on the same level with respect to the horizontal, the system is so adjusted that there will not be sufficient pressure exerted by either of the bellows 16 or 16' to close the corresponding switch contacts 22 or 22' which normally remain open. Assuming, however, that the car is traveling in the direction indicated by the arrow below direction selector switch 23 and that this switch is thrown in the direction of travel as shown, selector 15 will be rendered operative to control the apparatus of Fig. 2.

We will now assume that the car is traveling down grade in the direction indicated. In this case selector 15 will be lower than selector 15', and this will result in an increased height of the mercury column in selector 15 with increased pressure on bellows 16, which pressure will, in turn, be transmitted by the liquid in the system comprising bellows 24, coupling 25 and bellows 26 to the switch 33 as hereinafter more specifically described in connection with Fig. 3. If the down grade equals or exceeds a predetermined percentage value the pressure will cause bellows 16 to expand sufficiently to cause switch 33 to close and thereby connect the generator 12 to the load and battery circuits. For example, my system may be adjusted so that when a slight down grade is reached there will be a sufficient movement of 16 to cause switch 33 to close. When the grade reduces to less than the predetermined value, the collapsing of bellows 16 will cause the switch to open and disconnect the generator. One contact of each switch 33 is electrically connected together by conductor 53 which runs to conductor 48 of the control circuit of Fig. 2, while the other contact of each switch is connected to a separate contact on switch 23. The blade of the latter is connected to the other side of the control circuit of Fig. 2 by conductor 53'.

Since the circuit of grade selector switch 21' is open at switch 23, variations in pressure in selector 15' and movements of bellows 16' will not affect the electrical circuit. Thus when the car is traveling up-grade, although there will be an increase in pressure at 15' because the latter will be lower than the forward selector 15, nevertheless, switch contacts 22 will remain open and the closing of contacts 22' produces no change in the operative circuit. When the car is traveling in the opposite direction, switch 23 is thrown in the direction the car is traveling and in this case selector 15' controls, selector 15 having no effect upon the circuit.

As grade selector switches 21 and 21' are mounted on the body of the car which in turn is mounted on springs, there will be a considerable movement of the car body with respect to the trucks and selectors 15 and 15' due to swaying of the car in motion and movement while loading or unloading the same. Such movements would, if a heavy liquid were used in the transmitting systems comprising bellows 24, coupling 25 and bellows 26, have a tendency to disturb the main pressure system. If a lighter liquid, however, such as glycerin, is used a considerable movement of the car body will cause only a correspondingly small movement in the main pressure system due to the density of the mercury. In a similar manner the lighter liquid also serves as a buffer between disturbances in the main pressure system caused by uneven road-bed conditions and jars and prevents vibration or accidental closing of the switch contacts 22, 22'.

For practical considerations it may be necessary to mount the pipe 18 connecting the two grade selectors on the car body. The elevation of the car body will change slightly with loading conditions and it may at times be slightly tilted in the direction of motion. In practice therefore the mercury line should be mounted on or suspended from the underframe of the car body, so that when it is standing on a level track no point in the line will be higher than the bottom level of the bellows or sylphons mounted on the car trucks.

Fig. 3 shows in detail an improved type of a grade selector switch unit. When pressure is transmitted to the liquid between bellows 26 and casing 30 this pressure is, in turn, applied to the diaphragm 26' of the bellows. The upward movement of the bellows and plunger 29 against pivoted lever 31 will, when a sufficient travel of plunger 29 is reached, cause the lever to compress and pass the center line of spring 32. After the center line has been reached spring 32 will expand and cause the pivoted knife blade 33 to be quickly thrown, through medium of link 34, so that the blade will engage switch contacts 22 and thus close the circuit. When the pressure on diaphragm 26' is relieved, the restoring action of spring 35 will cause lever 31 to follow up until the center line of spring 32 has been passed in the opposite direction when the expansion of this spring will cause a quick breaking of the contacts to take place, and restore the switch to its original position. This arrangement provides a quick make-and-break action and prevents arcing over or burning of the contacts. Various other types of switch control units may be used instead of the type shown.

The control circuit and apparatus shown in Fig. 2 is designed to function under control of the grade selector switches in the following manner: The work or load circuit 5 is confined to the storage battery 36 at all times except (1) when the car is rolling down a grade equal to or in excess of the predetermined cut-in point as above stated, at which times the generator will charge the battery and furnish auxiliary power to the load circuit, thereby utilizing the excess power of the locomotive and/or kinetic energy of the car should such be available in excess of the energy required to overcome its rolling friction, (2) when the battery needs charging, at which times the generator 12 will be connected regardless of grade conditions, provided that its r. p. m. is sufficient to generate the proper voltage.

Before the charging generator can be connected to the battery and load circuit it is necessary that a proper voltage is available at the generator terminals before the differential main connecting switch 37 is closed, and that a proper voltage regulation for charging and supplying the load circuit is obtained. It is also necessary that the equipment automatically provide for floating the battery if it is fully charged when the car is traveling down grade, and that when the switch 37 is opened the difference in voltage across its contacts shall be substantially zero, that is, the voltages of the generator and battery should be the same.

To provide the foregoing regulation, the generator shunt field 38 is regulated by rheostat 39 which is responsive to the current flowing in solenoid coils 40 and 41. A carbon pile rheostat, as shown, will be effective for this purpose. Coil 41 is a potential coil across the generator circuit and is in series with a zero temperature coefficient resistor 58 which is tapped for different voltages as shown to compensate for the use of different types of storage batteries. The pilot lamp 59 indicates the condition at the generator terminals. Coil 40 is in series with the generator output and is effective only if main switch 37 is closed. The action of solenoid coils 40 and 41 on rheostat 39 is such that as the coil currents increase the resistance of 39 is increased, thereby reducing the generator field flux and consequently the generator voltage. This stabilizing action occurs irrespective of the r. p. m. of the generator, which, in turn, depends upon the car speed.

In addition to supplying current to the work circuit 5 the generator must also, when necessary, charge battery 36. At very low speeds the r. p. m. of the generator will be insufficient to generate a suitable voltage, and in order to avoid discharge of the battery thru the generator at such times the generator is automatically disconnected by switch 37. When this condition occurs, the generator circuit is opened at main switch contacts 37', 42 and 43. The opening and closing of this switch is controlled by the four solenoid coils 44, 45, 46 and 47. Coil 47 is a series coil and is connected to the series coil 40 by conductor 48. Coil 44 is connected across the contacts 37' and 42 of the main switch and is responsive to any differences in voltage between the generator and battery. This differential voltage must be practically zero before coil 44 becomes ineffective and releases plunger 49, and it acts as a lockout coil to prevent the main switch from closing except when the voltage conditions of the generator and battery are in the proper relation.

Coil 45 is the main switch closing coil and is aided slightly by coil 47. It will be seen that coils 45 and 46 are potential coils in series across the main generator leads 48. Coil 46 acts as a magnetic neutralizing coil to coil 44, and when balanced generator and battery voltages obtain, 44 and 46 each neutralize the magnetic action of the other on the plunger 49, leaving coil 45 free to close the switch. When the switch is closed coil 44 is shorted out leaving 46 free to aid 45 in magnetically sealing the switch. Since a considerable current flows through series coil 47, the combined action of 45 and 47 provides ample sealing effect; in fact, at this time it is desirable to diminish this sealing effect in order to increase the sensitivity of the switch for opening, and this is done by short circuiting a part of the winding of coil 45 thru the auxiliary tap 50 and contacts 42 and 43 which are connected by brush 37'. The switch is now responsive to the reversal of a relatively small current in coil 47 which occurs when the generator voltage becomes lower than the battery voltage.

In the field circuit of the generator 12 is placed a resistance 51 which is normally in circuit, but which may be gradually short circuited by operation of the solenoid coil 52 under selective grade or emergency conditions. The directional switch 23 which is thrown in the direction in which the car is traveling is connected to coil 52 by means of conductor 53' and serves to connect coil 52 to either of the two grade selector switches 21 and 21', dependent upon the direction of travel. Thus when the grade is sufficient to close the grade selector switch connected in circuit by directive switch 23 the coil 52 will become energized, and by means of solenoid plunger 54 and contact arm 55 the resistance 51 is progressively removed from the shunt field circuit to cause building up of the generator voltage to a value which will equal the voltage of battery 36 and permit the closing of main switch 37. The rate at which the resistance 51 is removed and inserted in the circuit depends upon the electrical characteristics of the generator. The resistance remains short circuited as long as coil 52 remains energized.

It will also be seen from the diagram that the circuit to coil 52 may be closed thru the contacts 56 of a relay 54. The energizing circuit thru the winding of this relay is completed thru the closing of a contact in an ampere hour meter 55 which is connected in series in the battery circuit. The ampere hour meter is compensated for the difference between ampere hours input and output, and contact is made in the meter closing the energizing circuit of relay 54 when the available ampere hours in the battery has reached a predetermined minimum value. This operation provides that if the battery is discharged to a given point generator 12 will be rendered operative to charge the battery regardless of grade conditions. If, however, when coil 52 is energized the generator voltage is below the battery voltage because of insufficient speed, then main switch 37 remains open and the battery will continue to take the load until conditions improve. When the battery becomes partly charged ampere hour meter 55 will open the circuit of 54 and thereby discontinue the charge.

In the event that it is desired to make the connection of the generator independent of grade conditions, switch 23 may be thrown downward to engage contact 64 thus energizing relay 52 in the generator starting circuit. In this case the connection of the generator to the load will depend upon the speed of the train and be independent of the grade over which the car is traveling.

It will be understood by those skilled in the art that relay 52 of the control circuit may be connected to draw its operating current from battery 16 instead of the generator, if desired.

Certain of the advantages resulting from the employment of the present invention will be apparent from a consideration of a number of practical points involved in the application of mechanical refrigeration and heating, so called. Assuming a locomotive of 2500 horsepower capable of handling a train of 75 iced refrigerator cars over the ruling grade of the division to which it was assigned and assuming further that mechanical refrigeration would require, say, a load of 10 horsepower per car, it is clear that the total load to be taken from the locomotive for mechanical refrigeration of the train, assuming all refrigeration load connected, when the train was on the ruling grade above mentioned, would be 750 horsepower. In other words the effective power available for pulling the train would be the difference between the locomotive rating of 2500 horsepower and the 750 horsepower going into refrigeration, or 1750 horsepower.

If this locomotive were used and mechanical refrigeration applied to its entire train it would be impossible to maintain the desired speed of transit. To do so the locomotive horsepower would have to be increased by 750, it being borne in mind, of course, that the figures used are relative. With maintenance of speed essential, and a locomotive of increased horsepower not available, there would be no alternative but to reduce the number of cars. Since, in practice, neither reduction in hauling capacity, i. e. number of cars, nor slower speed is acceptable, mechanical refrigeration to be practical must make use of some means whereby the drain will not be on the locomotive during the periods when it is operating on ascending grades. With the present system the load is normally taken from the battery except when going down grade, at which times the load will be automatically transferred to the generator and the battery will be charged. While it may rarely happen that the entire refrigeration load will occur at any one time the worst conditions possible will be taken care of by the system.

It will be seen that the present invention provides means, preferably activated by hydrostatic pressure, for the storage and subsequent diversified usage of the motive force of a transport vehicle or train of vehicles in excess of that part of it required for traction effort when the drag load or call on the motive force is lessened by kinetic energy derived from the vehicle or train. The released or excess tractive power may be used to the degree permitted by the increment of kinetic energy up to the point where the applied kinetic force is great enough in itself to overcome the rolling friction of the moving vehicle or train, at which point, of course, the entire motive force of the prime mover or train motor is released for storage and utilization. Finally, where the kinetic energy or force is in excess of this last amount so that there is additional energy available over and beyond that required to overcome friction, and afford motion at desired speed, the invention provides for the storage and utilization of such excess kinetic energy as well as of the full power of the prime mover.

I claim:

1. The method of storing and utilizing the surplus tractive power of a motor-driven vehicle having a power plant operative from its running gear, which consists in operatively connecting said power plant to the running gear when the vehicle is traveling down grade to conserve surplus power of the vehicle motor, disconnecting said power plant from the running gear under all other grade conditions, and operatively connecting the power plant to the running gear regardless of grade conditions when the power supply of said plant has been reduced to a predetermined minimum value.

2. The combination with a transport vehicle having auxiliary apparatus powered by a power plant operatively connected to the running gear of the vehicle, means for controlling the operation of the power plant rendered effective by changes in the hydrostatic pressure of a fluid medium as determined by the gradient of the road over which the vehicle is traveling, and a hydrostatic pressure system comprising a source of pressure mounted on the vehicle body and extending through a substantial portion of its length, a grade selector switch unit also mounted on the body of the vehicle, and connections affording relative movement between said unit and said pressure source.

3. The combination with a plurality of transport vehicles connected together and each having auxiliary apparatus powered by a separate power plan operatively connected to its running gear, of means for controlling the connection of the power plant rendered effective by changes in the hydrostatic pressure of a fluid medium as determined by the gradient of the road over which the vehicle is traveling, and a hydrostatic pressure system comprising a source of pressure mounted on the vehicle body and extending through a substantial portion of its length, a grade selector switch unit also mounted on the body of the vehicle, and connections affording relative movement between said unit and said pressure source.

4. The combination of a transport vehicle having auxiliary apparatus powered by a power plant including an electric generator driven from the running gear of the vehicle, a storage unit adapted to be connected to the generator, means for controlling the connection of the generator to the storage unit comprising a system in which changes in the hydrostatic pressure of a liquid at a plurality of points in the system are determined by the gradient of the road over which the vehicle is traveling, said system comprising a fluid pressure container extending through a substantial portion of the length of the vehicle and secured in fixed relation to the lower portion of its body, hydrostatic pressure grade selectors mounted on the trucks of the vehicle near its opposite ends, and connections affording relative movement between said container and said grade selectors.

5. The combination of a transport vehicle having auxiliary apparatus powered by a power plant including an electric generator driven from the running gear of the vehicle, a storage unit adapted to be connected to the generator, means for controlling the connection of the generator to the storage unit comprising a system in which changes in the hydrostatic pressure of a liquid at a plurality of points in the system are determined by the gradient of the road over which the vehicle is traveling, said system comprising a fluid pressure container extending through a substantial portion of the length of the vehicle and secured in fixed relation to the lower portion of its body, hydrostatic pressure grade selectors mounted on the trucks of the vehicle near its opposite ends, and connections affording relative movement between said container and said grade selectors, hydrostatic grade selector switch units mounted on the body of the vehicle and connections affording relative movement between said switch units and said grade selectors.

6. The combination of a power plant for transport vehicles including an electric generator driven from the running gear of the vehicle, means for connecting the generator to a storage unit and load circuit comprising a switch operated by hydrostatic pressure of a liquid when the vehicle is traveling down a predetermined grade, means for opening the generator circuit when the down grade decreases below a predetermined minimum, and a hydrostatic pressure system comprising a source of hydrostatic pressure on the body of the transport vehicle and extending lengthwise of the vehicle for a substantial portion of its length, a grade selector switch unit for operating said switch, said unit also being mounted on the body of the vehicle, and flexible connections between said unit and said source of pressure.

7. A system for reducing the load on the engine pulling a train of cars which are equipped with a power plant including a generator driven from an axle of a car, the system comprising means for causing the hydrostatic pressure of a column of liquid to increase when the vehicle is traveling down a predetermined grade such that the kinetic energy of the train will drive the generator, means whereby such increased pressure will connect the generator to a storage unit and load circuit, means for opening the generator circuit when the hydrostatic pressure is reduced below a predetermined minimum as determined by grade conditions, and a hydrostatic pressure system comprising a source of hydrostatic pressure rigidly mounted on the body of a car, a grade selector device mounted on the truck carrying the axle of the car, a grade selector unit device mounted on the body of the car, connections between said source of pressure and said grade selector device, and connections between said grade selector device and said switch unit device.

8. A transport car power plant comprising a storage battery for supplying current to a work circuit, a generator driven from the running gear of the car for charging said battery, grade selector means in which the pressure exerted by a liquid column varies with the grade of the road over which the car is traveling, and means connected to the grade selector means to transmit the pressure exerted by said liquid column to operate switching means controlling the connection of the generator to the storage battery.

9. A transport car power plant having a storage battery for supplying current to a work circuit, a generator driven from the running gear of the car for charging the battery, a grade selector system in which the pressure exerted by a column of liquid varies with the grade of the road over which the car is traveling, pressure operated switching means for controlling the connection of the generator to the storage battery, and an auxiliary column of liquid of different density from the first named column of liquid for transmitting the pressure exerted by the liquid in the grade selector system to the switching means.

10. A transport car power plant having a storage battery for normally supplying current to a work circuit, a generator driven from an axle of the car for charging the battery, a grade selector system in which the pressure exerted by a column of liquid of high density varies directly with the grade of the road over which the car is traveling, pressure operated switching means for controlling the connection of the generator to the battery, and an auxiliary column of liquid of lower density for transmitting the pressure exerted by the liquid of high density to the switching means.

11. A transport car power plant having a storage battery for normally supplying current to a work circuit, a generator driven from an axle of the car for charging the battery, grade selector units at each end of the car connected by a conduit to form a continuous system, the system being filled with a liquid of high density whereby a difference in level between the grade selector units, as determined by the grade of the road, will cause an increase in pressure in the unit of lower level, and means whereby a predetermined increase in pressure will operate switching means to connect the generator to the battery when the car is traveling down grade, and means for preventing the connection of the generator under all other grade conditions.

12. A railway car power plant having a storage battery for normally supplying current to a work circuit, a generator driven from an axle of the car for charging the battery, grade selector units mounted on trucks at each end of the car, a conduit system on the car body with flexible connections to the selector units, the system being filled with a liquid of high density whereby a difference in the level between the grade selectors, as determined by the grade of the track, will cause an increase in hydrostatic pressure in the unit of lower level, means for exerting a balanced pressure on the liquid in each of the grade selectors, means for operating a switch to connect the generator to the battery when the increase in pressure in the unit of lower level due to down grade conditions is sufficient to overcome the balanced pressure on the system, and means for preventing the connection of the generator under other grade conditions.

13. A railway car power plant having a storage battery for normally supplying current to a work circuit, a generator driven from an axle of the car for charging the battery and supplying current to the work circuit, grade selector units mounted on the car trucks at each end of the car and a pipe mounted on the car body with flexible connections between said selector units and pipe to form a continuous conduit system, the system being filled with a liquid of high density whereby a difference in level between the grade selector units, as determined by the grade of the road over which the car is traveling, will cause an increase in hydrostatic pressure in the selector unit of lower level, a flexible conduit system connecting at least one of the selector units with a pressure operated switch unit mounted on the car body, the latter system being filled with a liquid of lower density to transmit the hydrostatic pressure to the switch without disturbing the system due to movement of the car body with respect to the trucks, means whereby the increase in pressure caused by a predetermined down grade will operate the switch to connect the generator to the battery and load circuit, means to prevent connection of the generator under all other grade conditions, means to prevent connection of the generator when the proper voltage conditions are not obtained, and means independent of grade conditions for connecting the generator to the battery when the latter is discharged to a predetermined degree.

14. In a grade control system of the character described, a charging generator and a storage unit, switching means controlled by predetermined grade conditions over which the vehicle is traveling for connecting the charging generator to the storage unit, means to prevent connection of the generator under all other grade conditions, means independent of grade conditions for connecting the generator to the storage unit when the latter is discharged to a predetermined degree, and means to prevent connection and disconnection of the generator except when proper voltage conditions obtain.

15. In a grade control system of the character described, a charging generator and a storage unit, a plurality of switching means controlled by predetermined grade conditions over which the vehicle is traveling for connecting the charging generator to the storage unit, means for selectively connecting said switching means to the generator control circuit, means to prevent connection of the generator under all other grade conditions, means independent of grade conditions for connecting the generator to the battery when the latter is discharged to a predetermined degree, means to prevent connection and disconnection of the generator except when proper voltage conditions obtain.

16. In a grade control system of the character described, a charging generator and a storage unit, switching means actuated by down grade conditions over which the car is traveling for connecting the charging generator to the storage unit, means to prevent connection of the generator under all other grade conditions, means comprising a current measuring instrument for connecting the generator to the storage unit when the latter is discharged to a predetermined degree, said latter means operating independently of grade conditions, means to prevent connection and disconnection of the generator except when proper voltage conditions obtain, and means for disabling said grade control switching means.

WILLIAM PLATTS KELLETT.